(12) United States Patent
Descheemaeker et al.

(10) Patent No.: US 10,604,270 B2
(45) Date of Patent: Mar. 31, 2020

(54) DISPLAY SYSTEM OF AN AIRCRAFT

(71) Applicant: Airbus Operations SAS, Toulouse (FR)

(72) Inventors: Cedric Descheemaeker, Beauzelle (FR); Javier Manjon Sanchez, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 26 days.

(21) Appl. No.: 15/977,663

(22) Filed: May 11, 2018

(65) Prior Publication Data
US 2018/0334262 A1    Nov. 22, 2018

(30) Foreign Application Priority Data
May 17, 2017   (FR) ...................................... 17 54329

(51) Int. Cl.
*B64D 45/00*     (2006.01)
*G06F 3/14*      (2006.01)
*H04N 5/58*      (2006.01)
*G02B 27/01*     (2006.01)

(52) U.S. Cl.
CPC ......... *B64D 45/00* (2013.01); *G02B 27/0172* (2013.01); *G06F 3/1423* (2013.01); *H04N 5/58* (2013.01); *G02B 2027/0118* (2013.01); *G02B 2027/0178* (2013.01); *G09G 2320/0626* (2013.01); *G09G 2380/12* (2013.01)

(58) Field of Classification Search
CPC ........ G02B 2027/0178; G02B 27/0172; G02B 27/017; G02B 2027/0132; G02B 5/23; G09G 2320/0626; G09G 3/3406; G09G 2360/144; G09G 3/19; G09G 3/38
See application file for complete search history.

(56) References Cited

U.S. PATENT DOCUMENTS 4,021,935 A * 5/1977 Witt .................... G02F 1/13306
                                                434/36
8,681,073 B1    3/2014 Robbins et al.
(Continued)

FOREIGN PATENT DOCUMENTS

FR        3016448        7/2015

OTHER PUBLICATIONS

French Search Report, dated Jan. 31, 2018, priority document.

*Primary Examiner* — Gerald Johnson
(74) *Attorney, Agent, or Firm* — Greer, Burns & Crain Ltd.

(57) ABSTRACT

The display system for a cockpit of an aircraft comprises a transparent display device and a display computer. The transparent display device includes a brightness masking device that can be commanded according to at least three predetermined levels of opacity in at least four masking independent zones. The display system includes a brightness sensor. The display computer is configured to determine a level of brightness due to the light source, in display zones corresponding to each of the masking zones, depending on information coming from the brightness sensor; determine an opacity level associated with each of the masking zones, depending on the brightness level determined, such that a higher level of opacity corresponds to a higher level of brightness; and command the opacity level in each of the masking zones of the brightness masking device.

9 Claims, 5 Drawing Sheets

(56) References Cited

U.S. PATENT DOCUMENTS

| | | | |
|---|---|---|---|
| 2010/0094501 A1* | 4/2010 | Kwok | G02B 27/01 |
| | | | 701/36 |
| 2015/0177864 A1* | 6/2015 | Wong | G02B 27/017 |
| | | | 345/175 |
| 2016/0170206 A1 | 6/2016 | Osborne et al. | |
| 2016/0357014 A1 | 12/2016 | Beckman | |
| 2017/0090194 A1 | 3/2017 | Hayes | |
| 2018/0088323 A1* | 3/2018 | Bao | G01C 21/365 |

\* cited by examiner

DISPLAY SYSTEM OF AN AIRCRAFT

CROSS-REFERENCES TO RELATED APPLICATIONS

This application claims the benefit of the French patent application No. 1754329 filed on May 17, 2017, the entire disclosures of which are incorporated herein by way of reference.

BACKGROUND OF THE INVENTION

The invention relates to the display of piloting assistance information in an aircraft cockpit. Modern aircraft, in particular transport planes, include a system for displaying information in the cockpit thereof. Such a system, for example of CDS ("Control and Display System") type commands the display of information on screens, called head-down screens, of the cockpit: to view this information, the user, generally a pilot or a co-pilot of the aircraft, must lower their head in order to look at the screens. They cannot therefore simultaneously see the environment of the aircraft through a windscreen of the cockpit. In order to allow the user to see a display of information without being forced to lower their head in order to look at the screens, some aircraft are now equipped with a head-up display (HUD) device or a display device configured to be worn such as to be rigidly connected to the head of the user. Such a device is commonly called a HMD meaning "head-mounted display." It is sometimes also called a HWD meaning "head-worn display." It generally includes a display mounted such as to be rigidly connected to glasses or to a headset, such that the user can see information displayed on the display when the user wears these glasses or this headset. In the remainder of the description, the term HMD refers to both a HMD device and a HWD device. The display is transparent such that the user can view the information displayed in a superimposed manner on the environment. In the whole description, the term transparent refers to both a completely transparent display and a semi-transparent (and consequently semi-reflective) display. The HUD or HMD devices thus allow the user to view information while looking at the external environment of the aircraft through a windscreen of the cockpit. Yet, when the user looks outside the aircraft through such a windscreen, the user can sometimes be dazzled by a light source external to the aircraft, such as the sun. In such a situation, it can be difficult for the user to read information displayed on the display device.

SUMMARY OF THE INVENTION

In particular, an aim of the present invention is to provide a solution to these problems. It relates to a display system for a cockpit of an aircraft, the system comprising:
  a transparent display device provided to be used by a user in the cockpit of the aircraft; and
  a display computer configured to command the display of information on the transparent display device.

The system is characterized in that the transparent display device includes a brightness masking device that can be commanded to mask the brightness received by the user through the transparent display device according to at least three predetermined levels of opacity in at least four masking independent zones located facing the transparent display device,
  in that the display system includes a brightness sensor, and
  in that the display computer is configured to:
    determine a brightness level in display zones of the transparent display device corresponding to each of the masking independent zones, depending on information coming from the brightness sensor;
    determine an opacity level associated with each of the masking independent zones, depending on the brightness level determined for each of the corresponding display zones of the transparent display device, such that a higher level of opacity corresponds to a higher level of brightness; and
    command the opacity level in each of the masking zones of the brightness masking device, the opacity level commanded in a masking zone corresponding to the opacity associated level determined for this masking zone.

Thus, the display system commands the masking device such as to reduce the dazzling of the user when the transparent display device is exposed to a light source such as the sun, for example. The fact that the masking device includes at least four independent zones makes it possible to adjust the opacity level in a differentiated manner in the various masking zones depending on the brightness level determined for each one thereof. The fact that the opacity level is all the higher since the brightness level is high makes it possible to reduce the dazzling of the user in the zones most exposed to the light source, while limiting (or avoiding) masking in the zones least exposed to the light source such as to allow better visibility of the external environment.

In an advantageous embodiment, the display computer is further configured to:
  determine a brightness level for the display of information in each of the display zones of the transparent display device, this brightness level being determined depending on the opacity level associated with the corresponding masking zone, such that the brightness level is all the weaker since the opacity level is high; and
  command the display of the information on the transparent display device by applying the brightness levels determined for the various display zones.

The fact of displaying the information, in the various display zones, with a brightness level that is all the weaker since the opacity level is high makes it possible to obtain a substantially constant brightness contrast, from one zone to the other, between firstly the displayed information and secondly the environment that can be seen through the transparent display device. This improves the comfort of use of the system by the user.

According to various embodiments that can be combined with one another:
  the at least three predetermined levels of opacity correspond to a maximum opacity level, a minimum opacity level corresponding to a masking-absence command and, at least one intermediate opacity level between the preceding levels;
  the masking device corresponds to an electrochromic film or to electrochromic glass;
  the transparent display device corresponds to a head-up viewer or to a display device provided to be worn such as to be rigidly connected to the head of the user, in particular of HMD type;
  the brightness sensor is rigidly connected to the cockpit or is rigidly connected to the transparent display device;
  the system further includes at least one sensor for the orientation and the position of the head of the user and a memory comprising position information for at least one windscreen of the cockpit, and the display computer is further configured to:

acquire orientation information and position information for the head of the user, which information is provided by the at least one sensor;

acquire, from the memory, position information for the at least one windscreen of the cockpit; and determine, depending on the orientation information and on the position information for the head of the user and on the position information for the at least one windscreen of the cockpit, if a line of sight of the user intersects an internal element of the cockpit and, in such a case, command an opacity level, in each of the masking zones of the brightness masking device, corresponding to a minimum opacity level from the at least three predetermined levels of opacity.

The invention also relates to an aircraft including a display system as stated above.

BRIEF DESCRIPTION OF THE DRAWINGS

The invention will be better understood upon reading the following description and upon examining the appended figures.

FIG. 4b illustrates various opacity levels, in various masking zones, which opacity levels are adjusted to the brightness levels illustrated by FIG. 4a.

DETAILED DESCRIPTION OF THE PREFERRED EMBODIMENTS

Figure 1:
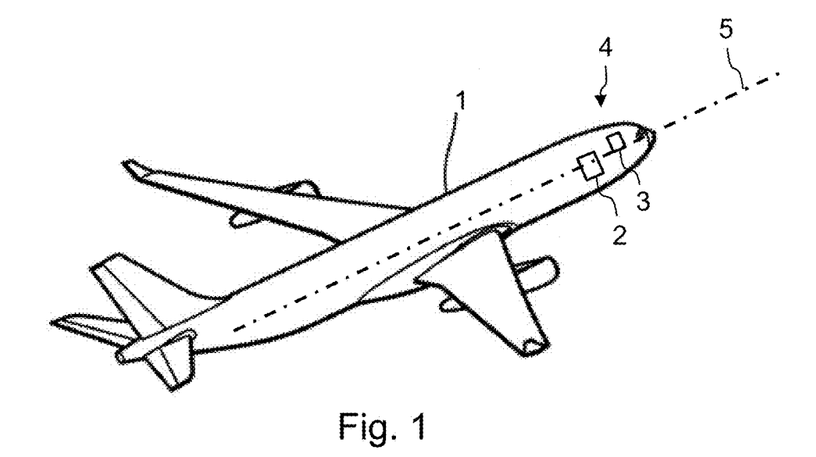
FIG. 1 illustrates, in a simplified manner, an aircraft including a cockpit.

The aircraft 1 shown in FIG. 1 includes a cockpit 3 in a front part 4 of the aircraft. It includes a longitudinal axis 5, corresponding to a roll axis of the aircraft. This longitudinal axis is substantially horizontal when the aircraft is parked on the ground. The aircraft also includes a yaw axis (not shown), substantially vertical when the aircraft is parked on the ground. As per convention, in the remainder of the description, the term horizontal refers to a straight line or a substantially horizontal plane when the aircraft is parked on the ground, such that this straight line or this plane is perpendicular to the yaw axis of the aircraft. In a similar manner, the term vertical refers to a straight line or a substantially vertical plane when the aircraft is parked on the ground, such that this straight line or this plane is parallel to (or contains) the yaw axis of the aircraft.

Figure 2A:
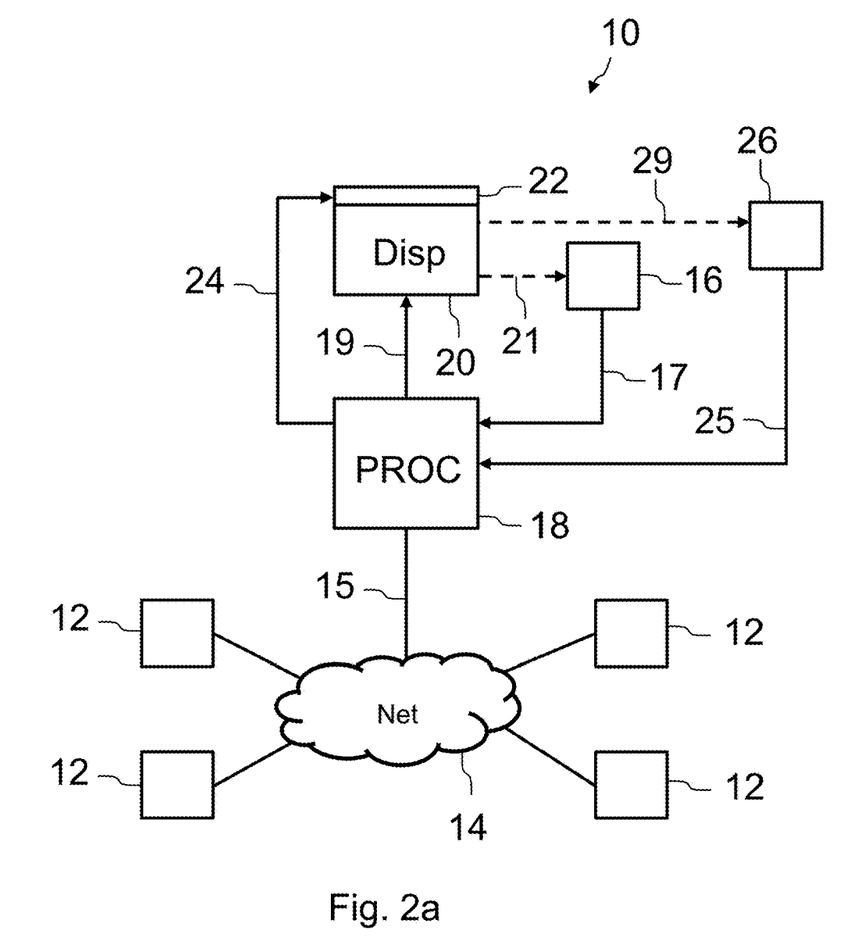
FIGS. 2a and 2b schematically illustrate embodiments, in accordance with the invention, of a display system of a cockpit of an aircraft.

The display system 10 shown in FIG. 2a includes a display computer 18 comprising a processing unit (designated as PROC in the figure). This processing unit can particularly correspond to a processor or a microprocessor of the display computer. According to various embodiments, the display computer 18 is a shared display computer controlling several display devices of the aircraft or a computer dedicated to the display system 10. In a particular embodiment, this computer corresponds to an IMA ("Integrated Modular Avionics") modular avionics type computer also supporting functions other than display. The display system 10 further includes a transparent display device 20 (designated as "Disp" in the figure). The transparent display device 20 is particularly of the HUD type or of the HMD type. As indicated above, the term transparent refers both to a completely transparent display device and a semi-transparent (and therefore semi-reflective) display device. A HUD-type display device includes a transparent screen provided to display information projected by means of a projector. The transparent screen allows a user to see the external environment of the aircraft while viewing the information displayed on this screen. A HMD-type display device is configured to be worn such as to be rigidly connected to the head of the user in the cockpit of the aircraft. Such a HMD device also includes a transparent screen, allowing a user to see the environment through this transparent screen while viewing the information displayed on this screen. Depending on the line of sight of the user, the environment corresponds either to the external environment of the aircraft, which can be seen through a windscreen of the cockpit 3, or to the internal environment of the cockpit. The transparent display device 20 is linked to the display computer 18 by a link 19. The display computer 18 is linked to at least one avionics computer 12 of the aircraft. In the particular example shown in FIG. 2, the display computer is linked to several avionics computers 12 via a link 15 of a communication network 14 (designated as "Net" in the figure) to which these avionics computers are also linked. The avionics computers 12 are, for example, located in an avionics bay 2 of the aircraft. The transparent display device 20 includes a brightness masking device 22. This masking device is linked to the display computer 18 by a link 24. It includes at least four masking independent zones in each of which the brightness masking can be commanded according to at least three predetermined levels of opacity, depending on commands received from the display computer via the link 24. The various masking independent zones are located facing corresponding display zones of the transparent display device 20. The masking device 22 corresponds, for example, to an electrochromic film or to electrochromic glass. More generally, the masking device 22 can use any technology suitable for varying the transparency thereof (and consequently the opacity thereof) thanks to an electric command. The display device 10 also includes a brightness sensor 26 linked to the display computer 18 via a link 25. The brightness sensor is, for example, a CMOS ("Complementary Metal Oxide Semiconductor") type or CCD ("Charge Coupled Device") type sensor like the sensors used in digital cameras.

Figure 4A:
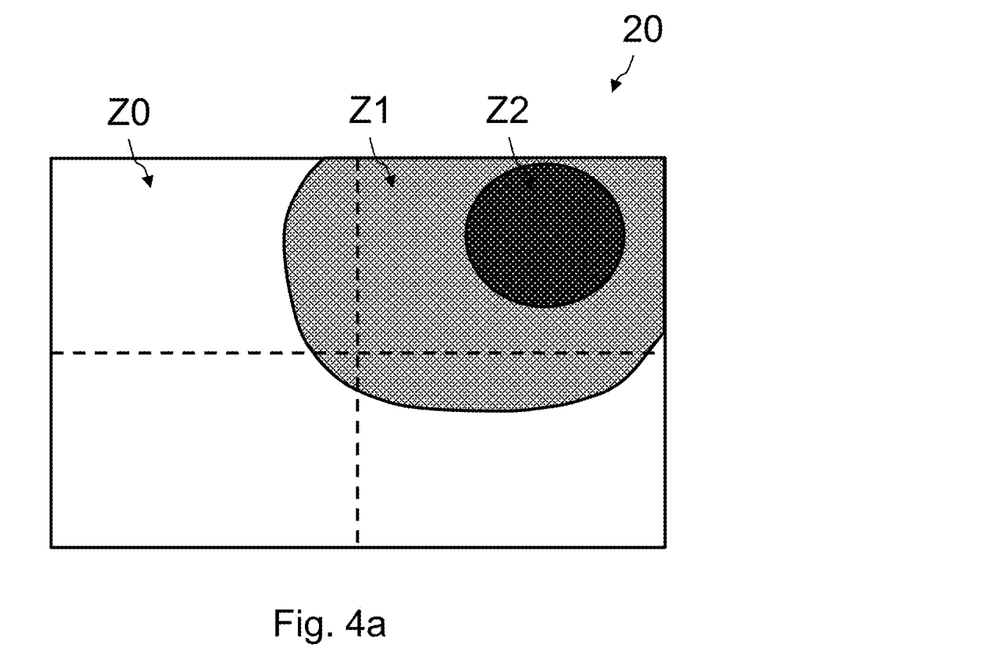
FIG. 4a illustrates an example in which various levels of brightness are caused by a light source on the display device of a display system.
Figure 4B:
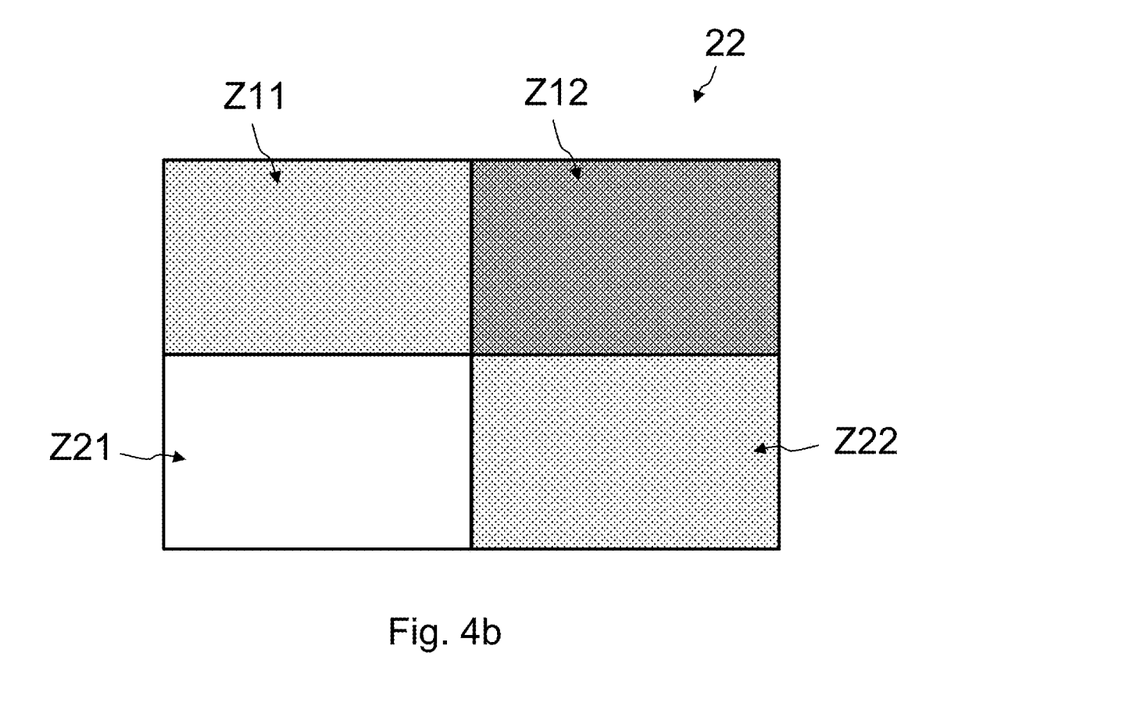

In operation, the display computer 18 is configured to command the display of information on the display device 20. This information comes, at least in part, from the at least one avionics computer 12 or is determined by the display computer 18 depending on information received from the at least one avionics computer 12. The display computer 18 is also configured to determine a level of brightness due to at least one or more light sources in each of the display zones of the transparent display device 20 corresponding to each of the masking independent zones of the masking device 22, depending on information coming from the brightness sensor 26. In the example illustrated in FIG. 4a, the brightness sensor 26 provides information making it possible to determine a maximum luminous intensity zone Z2. The information provided by the sensor 26 also makes it possible to determine an intermediate luminous intensity zone Z1 and a minimum luminous intensity zone Z0. Depending on the various luminous intensity zones Z0, Z1, Z2, the display computer 18 determines a level of brightness received in each of the display zones of the transparent display device 20. According to an embodiment, the brightness level determined for a display zone corresponds to the average luminous intensity received in the display zone. In another embodiment, this brightness level corresponds to the maximum luminous intensity received in the display zone. FIG. 4b illustrates an example in which the masking device 22 includes four masking independent zones Z11, Z12, Z21 and Z22 located facing four corresponding display zones of the transparent display device 20. The references Z11, Z12, Z21 and Z22 refer to both the masking zones and to the display zones, given that these are superimposed in the figure. With regard to the brightness zones Z0, Z1, Z2 illustrated in FIG. 4a, the determined level of brightness is at a maximum in the zone Z12, intermediate in the zones Z11 and Z22 and at a minimum in the zone Z21. Depending on the determined levels of brightness, the display computer 18 determines opacity levels associated with each of the masking zones. The opacity level determined for a masking zone is all the higher since the brightness level determined for the corresponding display zone is high. Thus, the opacity level is at a maximum in the zone Z12, intermediate in the zones Z11 and Z22 and at a minimum in the zone Z21. This minimum level of opacity corresponds, for example, to a masking-absence command. The display computer 18 commands the masking device 22, via the link 24, such as to apply the opacity levels determined in each of the masking independent zones.

According to a first alternative, the brightness sensor 26 is rigidly connected to the transparent display device 20, as symbolized in FIG. 2a by the link 29 in broken line. According to a second alternative, the brightness sensor 26 is rigidly connected to the cockpit 3 of the aircraft. In the second alternative, when the transparent display device 20 is of HMD type, the display system 10 further includes a sensor 16 for the orientation and the position of the head of the user. This sensor 16 is linked to the display computer 18 via a link 17. The sensor 26 makes it possible to determine various brightness zones with respect to the cockpit 3. Depending on the brightness zones and on information on the position and the orientation of the head of the user provided by the sensor 16, the display computer determines various brightness zones with respect to the transparent display device 20 when this is worn by the user, like the aforementioned zones Z0, Z1 and Z2. In a particular embodiment, the sensor 16 is mounted such as to be rigidly connected to the display device 20, as symbolized by the arrow 21 in broken line. It then corresponds, for example, to a set of inertial sensors integrated in the display device 20. In another particular embodiment, the sensor 16 is mounted such as to be rigidly connected to the cockpit 3 of the aircraft. It then corresponds, for example, to a camera arranged such as to automatically monitor the head of the user of the display device 20. Without departing from the scope of the invention, the sensor 16 can correspond to a group of sensors, for example a sensor for the orientation of the head of the user and a sensor for the position of the head of the user.

When the masking device 22 corresponds to an electrochromic film, in an embodiment of the invention this film is applied to a surface of the transparent display device 20. The film can be applied to the surface of the transparent display by simple contact or it can include an adhesive face stuck on the surface of the transparent display. In another embodiment, the electrochromic film is inserted between two layers of the transparent display, for example between two layers of glass or of a plastic material of the transparent display.

When the masking device 22 corresponds to electrochromic glass, this electrochromic glass corresponds, at least in part, to the transparent display 22. In an embodiment, this transparent glass corresponds to the transparent display of a HUD when the display device 20 is of HUD type.

Figure 5A:
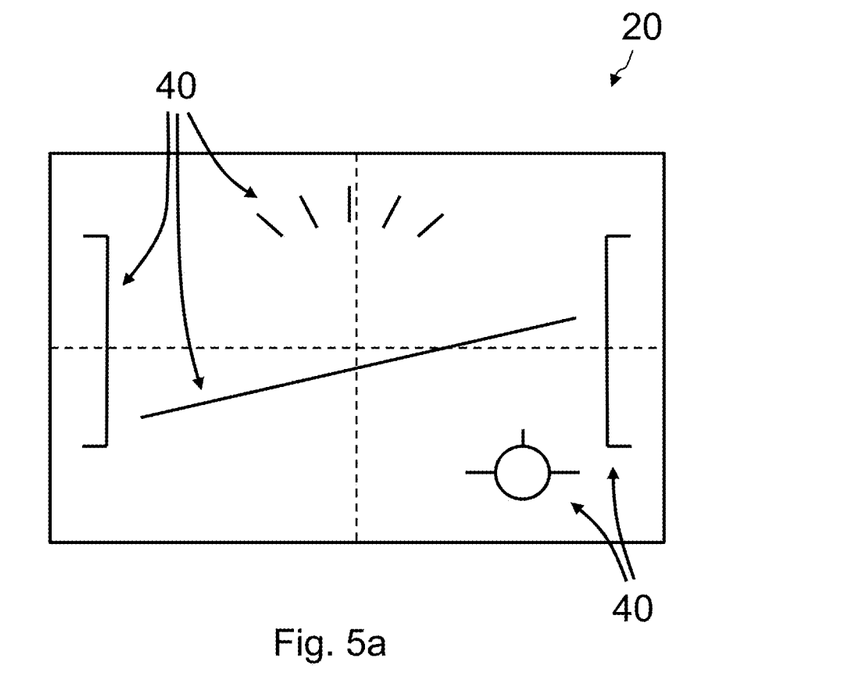
FIGS. 5a and 5b illustrate examples of displaying symbols on a display device, in a particular embodiment, in the absence of masking and in the presence of the masking, respectively, that is illustrated in FIG. 4b.
Figure 5B:
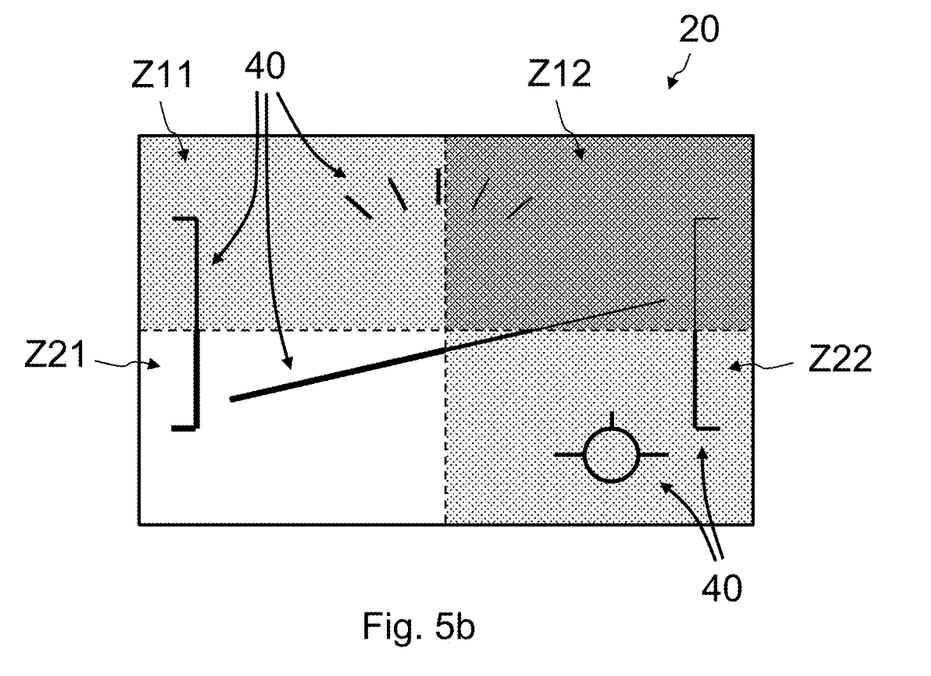

In an advantageous embodiment, the display computer 18 further determines a brightness level for the display of information in each of the display zones of the transparent display device. It determines this brightness level as a function of the opacity level associated with the corresponding masking zone, such that the brightness level is all the lower since the opacity level is high. The display computer 18 commands the display of the information on the transparent display device 20 by applying the brightness levels determined for the various display zones. Thus, in the context of the example described above and illustrated in FIGS. 4a and 4b, the display computer 18 determines a brightness level for the display of information in the display zones facing each of the masking zones Z11, Z12, Z21 and Z22. A minimum level of brightness is associated with the zone Z12 corresponding to the maximum level of opacity. A maximum level of brightness is associated with the zone Z21 corresponding to the minimum level of opacity. An intermediate level of brightness is associated with the zones Z11 and Z22 corresponding to the intermediate level of brightness. A particular case of displaying information 40 on the display device 20 is illustrated in FIG. 5a, with no dazzling due to a light source like the sun. FIG. 5b illustrates the display of the same information on the display device 20, facing the masking zones Z11, Z12, Z21 and Z22, by applying the determined levels of brightness that correspond to these masking zones. For reasons of legibility of FIG. 5b, the information 40 is shown by means of lines, the width of which is all the greater since the brightness level is high. However, in reality, the width of the lines is preferably independent of the brightness level.

For the clarity of the description, the various examples illustrate three opacity levels, three brightness levels and four masking independent zones. This in no way limits the scope of the invention. Advantageously, the number of opacity levels, the number of brightness levels and the number of masking independent zones are higher, which allows a better visual comfort for the user. For example, the number of opacity levels and the number of brightness levels are equal to 256 (corresponding to an 8-bit encoding) or to 65536 (corresponding to a 16-bit encoding). The number of masking independent zones is, for example, equal to 256, corresponding to masking independent zones distributed along 16 rows and 16 columns. These examples are given by way of illustration and other numbers of opacity levels, brightness levels and masking zones can be used without departing from the scope of the invention. In particular, such higher numbers of opacity levels and of brightness levels, which are associated with a higher number of masking independent zones, make it possible to ensure that a brightness contrast level perceived by the user between, firstly, the displayed information 40 and, secondly, the environment that can be seen via transparency through the transparent display device (when the opacity level permits it), is substantially constant over the whole of the surface of the transparent display device 20. This makes it possible to improve the visual comfort of the user.

Figure 2B:
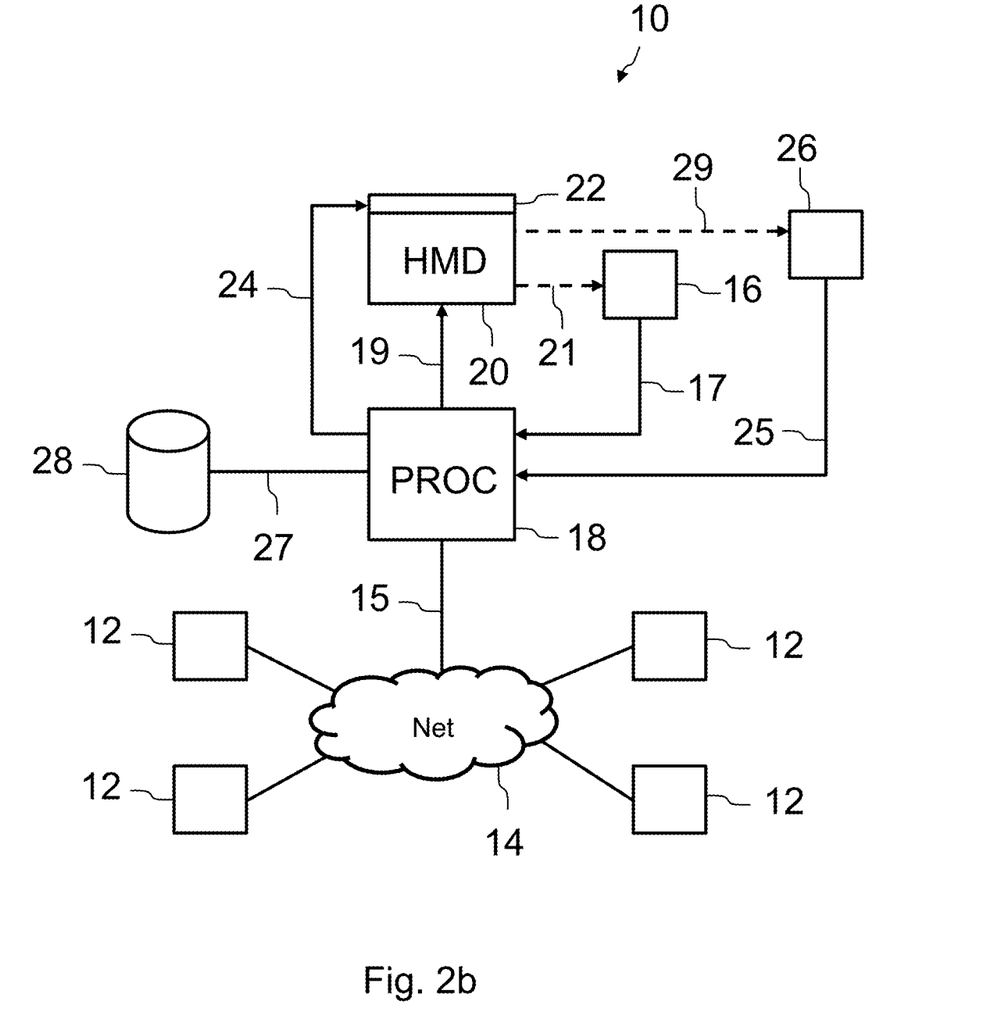

In a particular embodiment, since the transparent display device 20 is of HMD type, the display system 10 includes a sensor 16 for the orientation and the position of the head of the user, as mentioned above. It also includes a memory comprising position information for at least one windscreen of the cockpit. This information corresponds, for example, to points of the perimeter of the windscreen. It is, for example, defined in a three-dimensional reference frame linked to the cockpit. Particularly, as shown in FIG. 2b, the memory corresponds to a database 28 comprising cockpit internal geometry information. The database 28 is linked to the display computer 18 via a link 27. The cockpit internal geometry information contained in the database 28 comes, for example, from a digital model of the aircraft or of the cockpit of the aircraft, particularly from a three-dimensional digital model. Advantageously, this geometry information is simplified, with respect to information of the digital model of the aircraft, such as to reduce the volume of the information and the calculating times. In this particular embodiment, the display computer 18 acquires information on the orientation and the position of the head of the user, which information is provided by the sensor 16, and cockpit geometry information coming from the database 28. Depending on the information, the display computer 18 determines if a line of sight of the user intersects an internal element of the cockpit rather than a windscreen and, in such a case, it commands an opacity level, in each of the masking independent zones of the brightness masking device 22, corresponding to a minimum level of opacity. This makes it possible to inhibit the masking when the user looks inside the cockpit, such as to allow the user to view internal elements of the cockpit through the transparent display device 20 without being troubled by such masking. Thus, the masking can only occur when the user looks at the external environment of the aircraft through a windscreen of the cockpit 3, in order to protect the user from dazzle due to the sun or another light source.

Figure 3A:
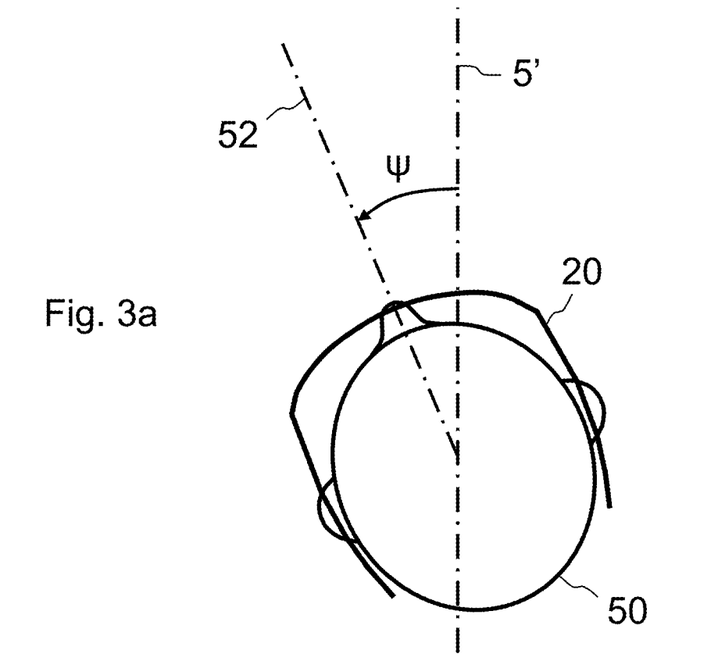
FIGS. 3a, 3b and 3c illustrate the orientation of the head of the user of a display system, as a top view, side view and back view, respectively.
Figures 3B, 3C:
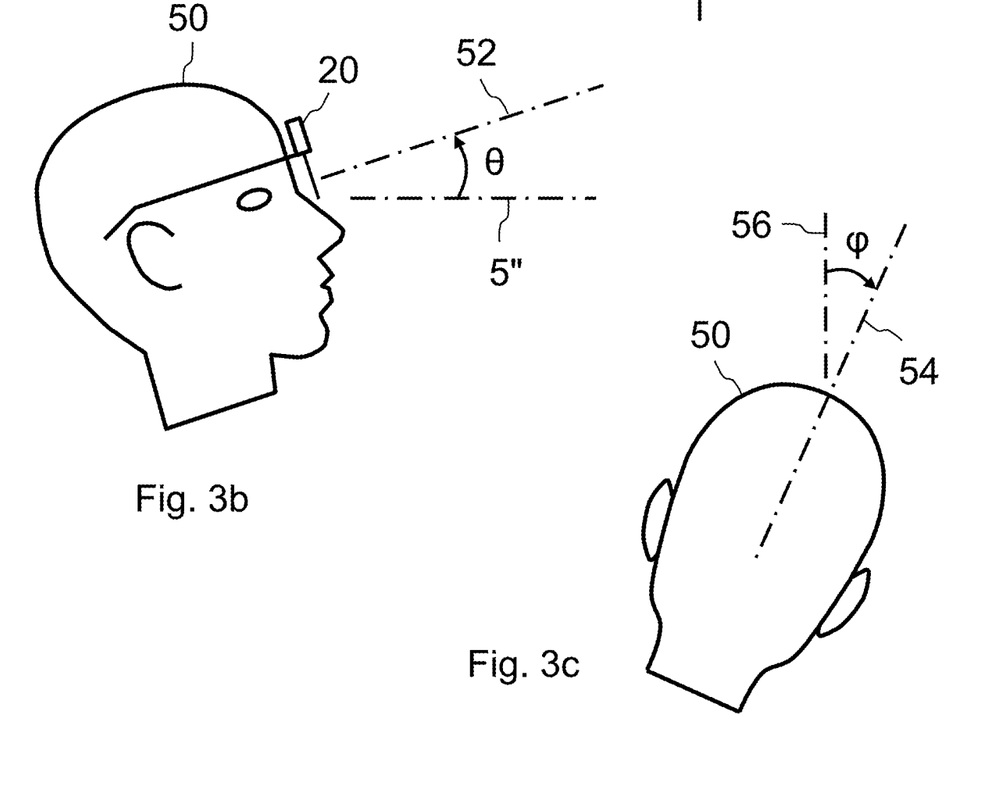

In an advantageous embodiment, the information on the orientation of the head of the user corresponds to at least one angle from a set of angles, such as are illustrated in FIGS. 3a, 3b and 3c. In these figures, the orientation of the head 50 of the user is shown by a straight line 52. In an exemplary embodiment, this straight line 52 corresponds to a theoretical line of sight of the user when the latter looks in front thereof without turning the eyes thereof either to the right or to the left and without raising or lowering the eyes. Other definitions of the orientation of the head of the user are, however, possible without departing from the scope of the invention. In the advantageous embodiment, the information on the orientation of the head of the user corresponds to at least one angle from a yaw angle $\psi$, a pitch angle $\theta$ and a roll angle $\varphi$ which are illustrated in FIGS. 3a, 3b and 3c, respectively. These angles are defined in a reference frame linked to the aircraft. Thus, the yaw angle $\psi$ is an angle, defined in projection in a horizontal plane, between a straight line 5' parallel to the longitudinal axis 5 of the aircraft and the straight line 52 representing the orientation of the head of the user. The pitch angle $\theta$ is an angle, defined in projection in a vertical plane parallel to the longitudinal axis 5 of the aircraft, between a straight line 5" parallel to the longitudinal axis 5 of the aircraft and the straight line 52 representing the orientation of the head of the user. The roll angle $\varphi$ is an angle defined in projection in a vertical plane perpendicular to the longitudinal axis 5 of the aircraft, between a vertical straight line 56 and a yaw axis 54 of the head of the user. The information on the orientation of the head of the user acquired by the display computer 18 corresponds to at least one of the angles $\psi$, $\theta$ and $\varphi$.

Advantageously again, the information on the position of the head of user corresponds to Cartesian coordinates, in an orthonormal reference frame, of a point located at the center of a segment linking the two eyes of the user. In particular, a first axis of the orthonormal coordinate system is parallel to the longitudinal axis 5, a second axis of the orthonormal coordinate system is vertical and a third axis of the orthonormal coordinate system is horizontal and perpendicular to the first two axes.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A display system for a cockpit of an aircraft, said display system comprising:
   a transparent display device provided to be used by a user in the cockpit of the aircraft; and
   a display computer configured to command a display of information on the transparent display device,
      the transparent display device including a brightness masking device that can be commanded to mask a brightness received by the user through the transparent display device according to at least three predetermined levels of opacity in at least four masking independent zones located facing the transparent display device,
   a brightness sensor wherein the brightness sensor is rigidly connected to the cockpit, and
   the display computer being configured to:
      determine a brightness level in display zones of the transparent display device corresponding to each of said masking independent zones, depending on information coming from the brightness sensor;
      determine an opacity level associated with each of said masking independent zones, depending on the brightness level determined for each corresponding display zone of the transparent display device, such that a higher level of opacity corresponds to a higher level of brightness; and
      command the opacity level in each of the masking independent zones of the brightness masking device, the opacity level commanded in a masking independent zone corresponding to the determined opacity level for this masking independent zone.

2. The system according to claim 1, wherein the display computer is further configured to:
   determine a brightness level for the display of information in each of the display zones of the transparent display device, this brightness level being determined depending on the opacity level associated with the corresponding masking independent zone, such that the brightness level is reduced when the opacity level is increased; and command the display of the information on the transparent display device by applying the display brightness levels determined for the various display zones.

3. The system according to claim 1, wherein said at least three predetermined levels of opacity correspond to:
   a maximum opacity level;
   a minimum opacity level corresponding to a masking-absence command; and
   at least one intermediate opacity level between the maximum and minimum levels.

4. The system according to claim 1, wherein the masking device comprises an electrochromic film.

5. The system according to claim 1, wherein the masking device comprises electrochromic glass.

6. The system according to claim 1, wherein the transparent display device corresponds to a head-up viewer.

7. The system according to claim 1, wherein the transparent display device corresponds to a display device provided to be worn such as to be rigidly connected to a head of the user.

8. The system according to claim 1, further including at least one sensor for an orientation and a position of a head of the user and a memory comprising position information for at least one windscreen of the cockpit, and the display computer is further configured to:
   acquire orientation information and position information for the head of the user, which information is provided by the at least one sensor;
   acquire, from the memory, position information for the at least one windscreen of the cockpit; and
   determine, depending on the orientation information and on the position information for the head of the user and on the position information for the at least one windscreen of the cockpit, if a line of sight of the user intersects an internal element of the cockpit and, in such a case, command an opacity level, in each of the masking independent zones of the brightness masking device, corresponding to a minimum opacity level from said at least three predetermined levels of opacity.

9. An aircraft comprising a display system comprising:
   a transparent display device provided to be used by a user in a cockpit of the aircraft; and
   a display computer configured to command a display of information on the transparent display device,
      the transparent display device including a brightness masking device that can be commanded to mask a brightness received by the user through the transparent display device according to at least three predetermined levels of opacity in at least four masking independent zones located facing the transparent display device,
   a brightness sensor wherein the brightness sensor is rigidly connected to the cockpit, and
      the display computer being configured to:
         determine a brightness level in display zones of the transparent display device corresponding to each of said masking independent zones, depending on information coming from the brightness sensor;
         determine an opacity level associated with each of said masking independent zones, depending on the brightness level determined for each of the corresponding display zones of the transparent display device, such that a higher level of opacity corresponds to a higher level of brightness; and
         command the opacity level in each of the masking independent zones of the brightness masking device, the opacity level commanded in a masking independent zone corresponding to the opacity associated level determined for this masking independent zone.

* * * * *